Sept. 26, 1950 F. P. ALLARD 2,523,410
LAMINATING MACHINE AND METHOD
Filed May 17, 1946 2 Sheets-Sheet 2
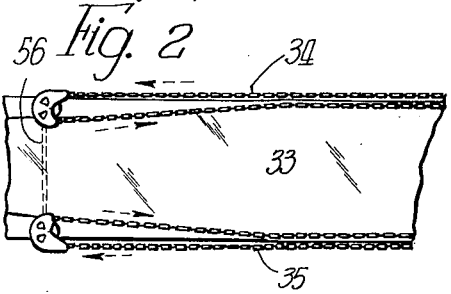
Fig. 2
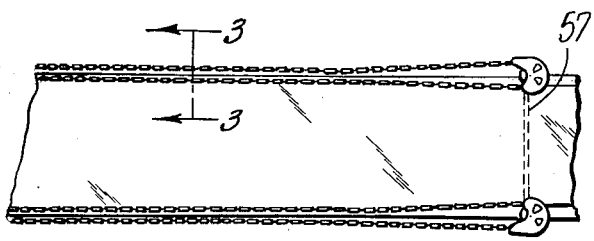
Fig. 3
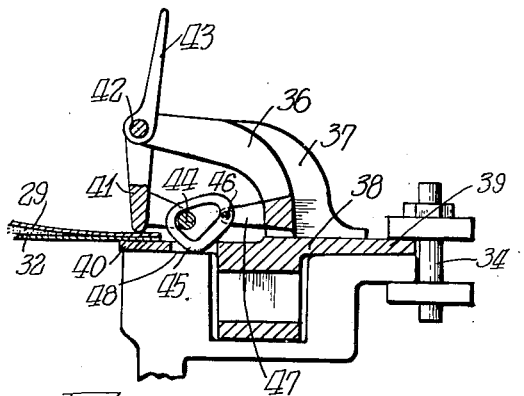
Fig. 4
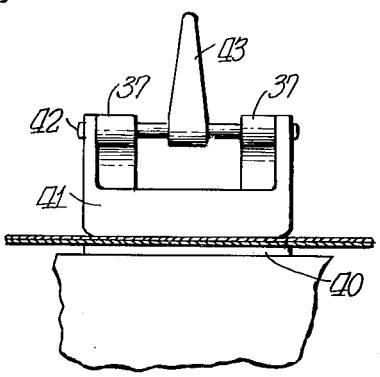
Fig. 5
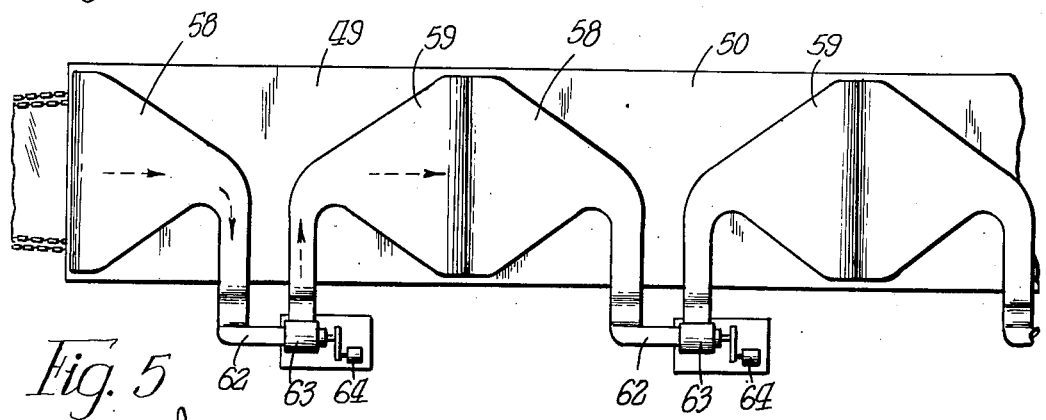
Fig. 6
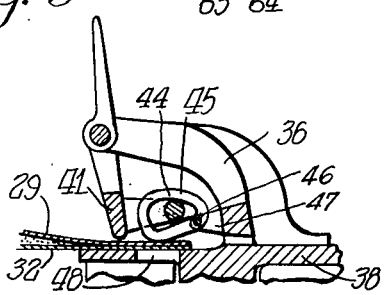
INVENTOR.
Frederic P. Allard
BY Cromwell, Greist & Warden
ATTORNEYS Patented Sept. 26, 1950

2,523,410

UNITED STATES PATENT OFFICE 2,523,410

LAMINATING MACHINE AND METHOD

Frederic P. Allard, Mount Vernon, Ohio, assignor to Shellmar Products Corporation, Chicago, Ill., a corporation of Delaware Application May 17, 1946, Serial No. 670,361

7 Claims. (Cl. 154—37)

My invention is concerned with a method and a machine for laminating with low pressure heat hardenable resins.

It is an object of my invention to provide a continuously operating machine particularly adapted for use in impregnating and/or laminating fabric webs with low pressure heat hardenable resinous compositions wherein mechanism is provided for supporting a plurality of supply rolls of fabric material, for heat treating the fabric web or webs to remove all moisture content, for impregnating and coating each web with a hardenable resinous composition, for bringing the webs together to form a laminate and simultaneously enclosing them between covering webs of cellophane or similar material, for conveying the enclosed laminate through a plurality of heating zones which are each supplied with circulating hot air and for controlling the temperature of the circulating air in each of the zones to properly cure the resin composition.

It is another object of my invention to provide a method of impregnating and coating one or more webs of fabric material, laminating the webs where a plurality of webs are used, enclosing the laminate between suitable webs of covering material and curing the resin by continuously passing the covered laminate through successive heating chambers which are each provided with circulating air heated to a predetermined temperature.

It is another object of my invention to provide in a method of fabric coating or laminating the steps of successively immersing the fabric in resinous compositions of different viscosity to first completely impregnate the fabric using resinous compositions having a low viscosity and then to coat the impregnated fabric using a resinous composition having a high viscosity.

These and other objects are attained by the method and apparatus which are described and illustrated herein by way of example, the preferred form of the apparatus being illustrated in the accompanying drawings, wherein:

Fig. 2 is a schematic plan illustrating the gripping chains which carry the laminate through the curing chambers;

Fig. 3 is a detail of one of the tenter clips which are carried on the gripper chains, the view being taken on a line corresponding to 3—3 of Fig. 2;

Fig. 4 is an end of Fig. 3;

Fig. 5 is a partial view similar to Fig. 3 showing the tenter clip members in the open position; and Fig. 6 is a partial plan view of the curing chambers.

Figure 1:
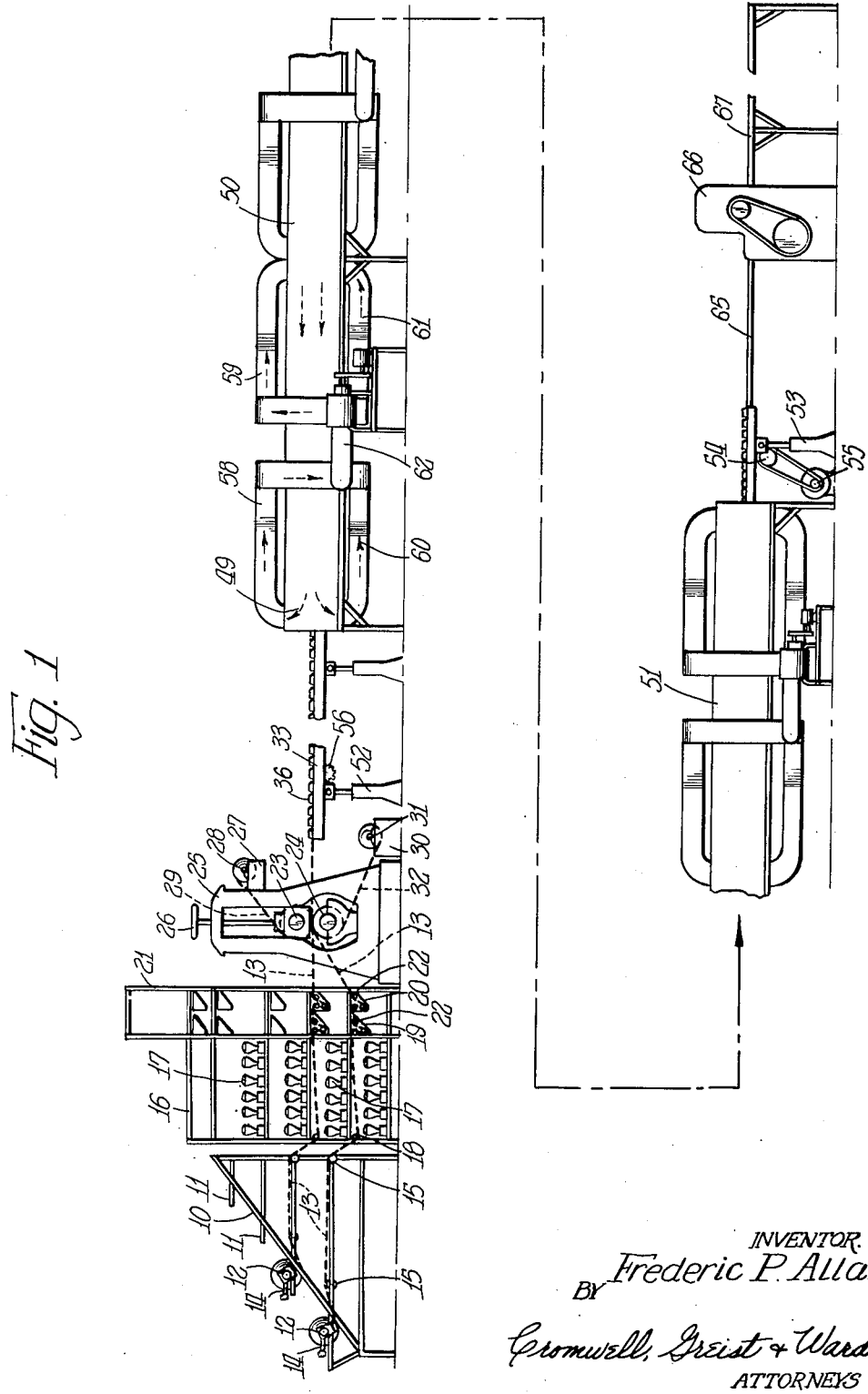
Fig. 1 is an elevation, with parts broken away, of the preferred form of my laminating machine.

Low pressure heat hardenable resins of various types may be used to impregnate and coat various kinds of fabric materials and when properly cured in successive stages by being subjected to different degrees of heat for a predetermined time will form a product which is uniform in thickness and free from blisters and other imperfections. Various thicknesses of material may be obtained by laminating a plurality of fabric webs in the same manner.

In carrying out my method I heat the fabric by means of a bank of heat lamps to completely remove any moisture present in the fabric. The moisture free fabric is then passed through an impregnating tank where it is thoroughly impregnated with a low viscosity heat polymerizable resin composition and any air within the fabric is completely displaced by the resin. This eliminates blisters which might otherwise form from entrapped air or moisture. If more than one web is used each of the webs is treated in this manner and all of them are then brought together and passed between compounding rollers to form a laminate.

A pair of top and bottom covering webs are passed between the compounding rollers with the laminate and the tension between the rollers is adjusted simultaneously with the compounding of the fabric webs. The covering webs which may be cellophane, cellulose acetate or similar material, are of a width sufficient to extend beyond the outer edges of the laminate so as to completely enclose the same. As the enclosed laminate leaves the compounding rollers the edges of the covering sheets are gripped on opposite sides and sufficient tension is applied gradually to stretch the covering webs in a manner which tends to draw them toward each other uniformly across the width of the laminate.

With the laminate thus enclosed between the stretched cellophane webs it is carried through a series of curing chambers. Each of the curing chambers is provided with a circulating air system and means for controlling the temperature of the air therein. In this manner the laminate is subject to a warm-up stage in the first heating chamber where the temperature is sufficient to gradually raise the temperature of the resin to very nearly the gel stage. In the next chamber the temperature is increased to bring the resin up to the gel stage. In the next chamber the temperature is raised sufficiently to bring the resin to the exothermic stage. Following this the temperature in the successive curing chambers is controlled in accordance with the particular resin used and the thickness of the laminate, it being maintained sufficiently high to completely harden the resin as desired. Where a relatively thin material is being cured it may be necessary to employ only one hardening chamber. Where there is a thick laminate being cured further hardening chambers may be employed. Upon completion of the curing the cellophane covering webs are stripped from the laminate and it is cut to the desired lengths.

A form of apparatus which may be successfully used in carrying out my laminating method as a continuous process is illustrated in the drawings. It comprises a supporting frame 10 having thereon bearing brackets 11 for supporting the shafts 12 of a plurality of rolls of fabric 13. The brackets 11 are supplied with conventional shaft engaging tension devices 14. The frame 10 is supplied with guide rollers 15 for directing the fabric webs 13 toward the frame 16.

Banks of infra-red lamps 17 are mounted on the frame 16 by means of which sufficient heat is directed onto the fabric to drive out all moisture present therein. Rollers 18 are provided to guide the fabric webs 13 over the lights 17. The fabric webs 13 then pass through resin filled tanks 19 and 20 mounted on the frame 21. Each of the tanks 19 and 20 is provided with guide rollers 22 which carry the web through the tank and insure contact with the resin composition in the tank.

Compounding rollers 23 and 24 are mounted on the frame 25. Upper roller 23 is supplied with a manually controlled adjusting device 26 for adjusting the tension between the rollers 23 and 24. Supporting brackets 27 are arranged above the roller 23 on the frame 25 to support a roll 28 of top covering material 29. Members 30 below the roller 24 at the base of the frame 25 are adapted to support a roll 31 of bottom covering material 32. The covering material or webs 29 and 32 are fed between the rollers 23 and 24 with the impregnated and coated fabric webs 13. The covering webs 29 and 32 are somewhat wider than the fabric webs 13 and completely enclose the laminate formed by the webs 13.

A table 33 is arranged at the delivery side of the rollers 23, 24 to receive the composite web as it leaves the compounding rollers 23, 24. A pair of endless chains 34 and 35 are arranged in parallel relation along the outer edges of the table 33 and provided with a driving means. A plurality of tenter clips or grippers 36 are mounted on the chains 34 and 35.

Each of these grippers 36 (Figs. 3 to 5) comprises a bracket 37 attached to a base plate 38 which is secured in any conventional manner to the chain at 39. The base plate 38 extends horizontally away from the chain 34 and is provided with a jaw portion 40. A movable jaw member 41 is pivoted at 42 to the bracket 37 and is provided with an upstanding trip arm or member 43. The jaw member 41 is provided with a cross bar 44 which engages in an elongated control link 45. The link 45 is pivotally mounted at 46 on bracket arms 47. The base plate 38 is provided with an aperture or slot 48 which when unobstructed, receives the free end of the pivoted link 45. The link 45 and the gripper member 41 are connected so that, when an obstruction is placed over the aperture 48, the link 45 is held in raised position and the gripper member 41 is thereby held out of gripping engagement with the jaw member 40. When the aperture 48 is unobstructed and the free end of the link 45 is permitted to fall into the aperture the gripper jaw member 41 is free to move forward into gripping engagement with the jaw member 40.

The movement of the chains 34 and 35 is controlled by cam grooves or the like, the path of movement being illustrated in Fig. 2 with the direction of movement indicated by arrows. As the composite web is fed from the compounding rolls 23 and 24 onto the table 33 the edges of the cellophane covering webs 29 and 32 extend between the gripper members or jaws 40 and 41 and over the apertures 48 thus holding the gripper member 41 out of gripping engagement with jaw member 40. As the chain members carrying grippers 36 move in the direction indicated by the arrows in Fig. 2 the grippers 36 on opposite sides at the receiving end of the table 33 move away from each other so that the edge of the covering webs move relative to the link 45 and uncover the apertures 48 whereupon the links 45 drop into the apertures 48 and permit the gripper members 40 and 41 to grip the edges of the webs 29 and 32 as illustrated in Fig. 3. A conventional trip means may be arranged in the path of movement of the gripper arms 43 to insure effective gripping operation of the members 40 and 41. Before the composite web arrives within the first heating chamber 49 the gripper members 36 are traveling in a straight line in parallel spaced relation. They are maintained in this relation through the remainder of the heating chambers 50, 51, etc.

The table 33 is supported by adjustable posts 52, 53 at the ends thereof. Additional supports may be provided throughout its length. One of the chains 34, 35 is driven by conventional drive means indicated at 54, 55. The other chain is connected by conventional adjustable transverse drive means indicated at 56, 57. The chains 34, 35 and the drive mechanism should be arranged so that uniform and coordinated movement of the chains 34, 35 is assured. The adjustment of the chains, 34, 35 relative to each other permits the use of the machine for various widths of material.

I have described specific gripper members 36 carried by the chains 34, 35, by way of example. Various other types of tenter clips may be utilized provided the gripping operation of the clip is such that it will grip the edges of the covering sheets 29 and 32 and hold them in a stretched, locking-grip relation during the passage through the heating chambers.

Each of the heating chambers is provided with means for circulating air throughout the chamber with means incorporated therein for controlling the temperature of the air. As illustrated, I have provided ducts 58, 59 on the top of each of the chambers and ducts 60, 61 on the bottom of the same. These ducts are connected as illustrated in Figs. 1 and 6 with a duct 62 having therein mechanism 63 which includes conventional electrically controlled heating means and a circulating fan driven by a motor 64. The movement of the air within the chambers is indicated in Figs. 1 and 6 by arrows in dotted line.

The air is forced into the heating chamber at the discharge end and circulated back through the chamber in a direction opposite to the movement of the laminate through the chamber so that the laminate is raised to the highest temperature in each chamber as it passes out of that chamber and into the next chamber. The heating means which heats the air in the duct 62 is controlled by aotomatic rheostats or in any other manner and conventional gauges may be supplied to indicate the temperature in the chamber so that the temperature in each chamber may be constantly checked and controlled as desired. Heating chambers may be provided as desired, each with its own individually controlled circulating air system.

At the discharge end of the last chamber 51 means is provided for tripping the gripper arms 43 and releasing the edges of the covering webs 29 and 32 from the grippers 36. A table 65 is provided to receive the cured laminate. A cutting mechanism 66 may be provided for dividing the cured laminate into sheets of any desired size. A receiving table 67 may also be provided.

My method and the apparatus which I have provided for carrying out the same are applicable to the continuous production of plastic sheet material using any of the resin compositions which may be polymerized by the application of heat alone or by heat and the relatively small pressure which is applied by the shrinking of the covering webs in the heating chambers of the apparatus. Any of the unsaturated polyester type resins may be used.

A typical operation of the machine will be as follows: One or more rolls of a fabric such as glass cloth are mounted on the supports 11 and the fabric 13 is carried over the lamps 17 and through the tanks 19 and 20.

The tank 19 is supplied with the following resin composition:

| | Parts |
|---|---|
| Selectron 5003 | 100 |
| Styrene | 15 |
| Benzoyl peroxide | 1 |

This composition provides a liquid having a viscosity of 31 seconds.

The tank 20 is provided with the following resin composition:

| | Parts |
|---|---|
| Selectron 5003 | 100 |
| Styrene | ½ |
| Benzoyl peroxide | 1 |

This provides a liquid having a viscosity of 112 seconds.

Selectron 5003 is a polymerizable resin composition manufactured by Pittsburgh Plate Glass Co. which I understand to be conjoint polymers of styrene with a polyester of an unsaturated dicarboxyl acid or acid anhydride.

Using several rolls of fabric the impregnated and coated fabric webs 13 are compounded and enclosed at the rollers 23 and 24 from which they pass to the grippers 36 on the chains 34 and 35 on the table 33. The chains 34, 35 are operated at a speed of from 9 to 12 ft. per minute. The laminate is carried through the successive heating chambers and subjected to different temperatures in four successive stages. In the first chamber, which may be designated the warm-up stage, the temperature is maintained between 150° and 170° F. In the second chamber, which may be designated the gel stage, the temperature is maintained at 170° to 190° F. In the third chamber, which is the exothermic stage, the temperature is maintained at 210° to 230° F. In the fourth successive chamber the temperature is maintained somewhere above 230° F. Any successive chambers which are provided in the apparatus need not be used unles the laminate is relatively thick, when a hardening temperature of 230° F. or more may be maintained in these chambers. The temperature and number of hardening chambers utilized depends of course upon the particular resin and the amount of the catalyst used.

The product obtained after the covering is stripped from the same is a hard laminate which is perfectly flat and free of wrinkles, sandy spots and other imperfections. The surface will depend upon the particular covering material which is supplied on the rolls 28 and 31. A cellophane covering material will produce a glossy uniform surface on the laminate very nearly the same as the surface on the cellophane.

As a modification of my method and machine I may continuously form and cure a web of the resin composition alone. This may be accomplished by substituting for the fabric roll supporting, impregnating and coating mechanism a film forming mechanism and arranging the roll supports 30 on the opposite side of the compounding roller frame 25 so that the film forming mechanism will deposit a film of liquid resin on the bottom covering web 32. The film is then enclosed between covering webs 29 and 32 and cured in the same manner as the laminate in the preferred form.

I claim:

1. A machine for continuously forming polymerizable resinous sheet materials comprising means for forming a sheet-like polymerizable resin product and enclosing it between top and bottom covering webs, means for gripping the edges of said covering webs and stretching them transversely, means for moving said gripping means in a predetermined path, a series of curing ovens arranged along said path, a circulating air system connected with each curing oven, and means for controlling the temperature of the circulating air in each curing oven for continuously polymerizing said sheet-like resin product in successive stages.

2. A laminating machine for continuously forming a sheet-like polymerizable resin product, comprising means for removing moisture from a web of fibrous material, means for impregnating and coating said fibrous material with a polymerizable resin, means for enclosing said impregnated and coated fibrous material between covering webs, means for stretching said covering webs transversely and for continuously carrying said webs through a predetermined path, a series of curing ovens arranged along said path, means for circulating a polymerizing medium in said ovens, and means for controlling the temperature of said medium in the individual curing ovens whereby the resin in said product is polymerized in successive stages.

3. A laminating machine comprising means for supporting rolls of fibrous material, heating means aligned therewith for heat treating the fibrous material, resin filled tanks adapted to be filled with a polymerizable resin for impregnating and coating the fibrous material, compounding rollers for forming the impregnated and coated fibrous material into a composite laminate, means at said compounding rollers for associating with said laminate top and bottom enclosing and carrying webs, a series of curing ovens, means for engaging the edges of said enclosing and carrying webs and stretching said webs transversely, means for continuously moving said edge engaging means in a predetermined path through said curing ovens, and heating means in said curing ovens for continuously curing in successive stages the resin in said laminate while carried between said webs.

4. A laminating machine for continuously forming sheet-like resin products comprising means for supporting a plurality of fabric supply rolls, heat lamps for heat treating the fabric to remove the moisture therein, resin containing dipping tanks for impregnating and then coating the fabric, compounding rollers for forming the impregnated and coated fabric into a composite laminate, means for supporting covering and enclosing webs adjacent the compounding rollers, a series of curing ovens arranged in aligned relation, a pair of parallel spaced endless gripper chains adapted to grip the edges of the covering and enclosing webs and carry the same through said curing ovens, means controlling the path of movement of said gripper chains whereby tension is applied to the edges of said covering and enclosing webs to stretch said webs, and means for circulating temperature controlled hot air connected with each of said curing ovens to provide a current of hot air in said ovens moving in a direction opposite to the travel of said webs, whereby to continuously cure the resin in said laminate in successive stages.

5. A method of continuously forming a resinous fibrous product comprising heating one or more webs of fibrous material to remove moisture therefrom, impregnating the fibrous material with a low viscosity polymerizable resin composition, coating the impregnated fibrous material with a high viscosity polymerizable resin composition, enclosing the impregnated and coated fibrous material between top and bottom covering webs, applying tension to the edges of said covering webs only, moving the webs and the resin impregnated and coated fibrous material through uninterruptedly successive heated zones, and regulating the temperature in said heated zones to polymerize the resin in successive stages.

6. A method of fabricating a resin product which comprises continuously forming a web having incorporated therein a heat polymerizable resin, enclosing said web between covering webs, moving the web enclosed material through a series of heated zones in uninterrupted succession while applying lateral tension to said covering webs only and regulating the heat in said zones to polymerize the resin in successive stages.

7. A method of fabricating a resin product which comprises continuously forming a sheet-like material having incorporated therein a heat polymerizable resin, enclosing said material between top and bottom covering webs, continuously moving said web enclosed material through successive uninterrupted polymerizable zones while applying lateral tension to said covering webs only and controlling the temperature of the material in each successive zone to polymerize the resin in successive stages.

FREDERIC P. ALLARD.

REFERENCES CITED

The following references are of record in the file of this patent:

UNITED STATES PATENTS

| Number | Name | Date |
| --- | --- | --- |
| 1,408,871 | Enos | Mar. 7, 1922 |
| 2,152,901 | Manning | Apr. 4, 1939 |
| 2,154,943 | King | Apr. 18, 1939 |
| 2,397,838 | Chavannes | Apr. 2, 1946 |
| 2,414,125 | Rheinfrank | Jan. 14, 1947 |
| 2,415,028 | Bosomworth et al. | Jan. 28, 1947 |
| 2,432,752 | Gray | Dec. 16, 1947 |
| 2,433,965 | Upson | Jan. 6, 1948 |